Patented Nov. 13, 1945

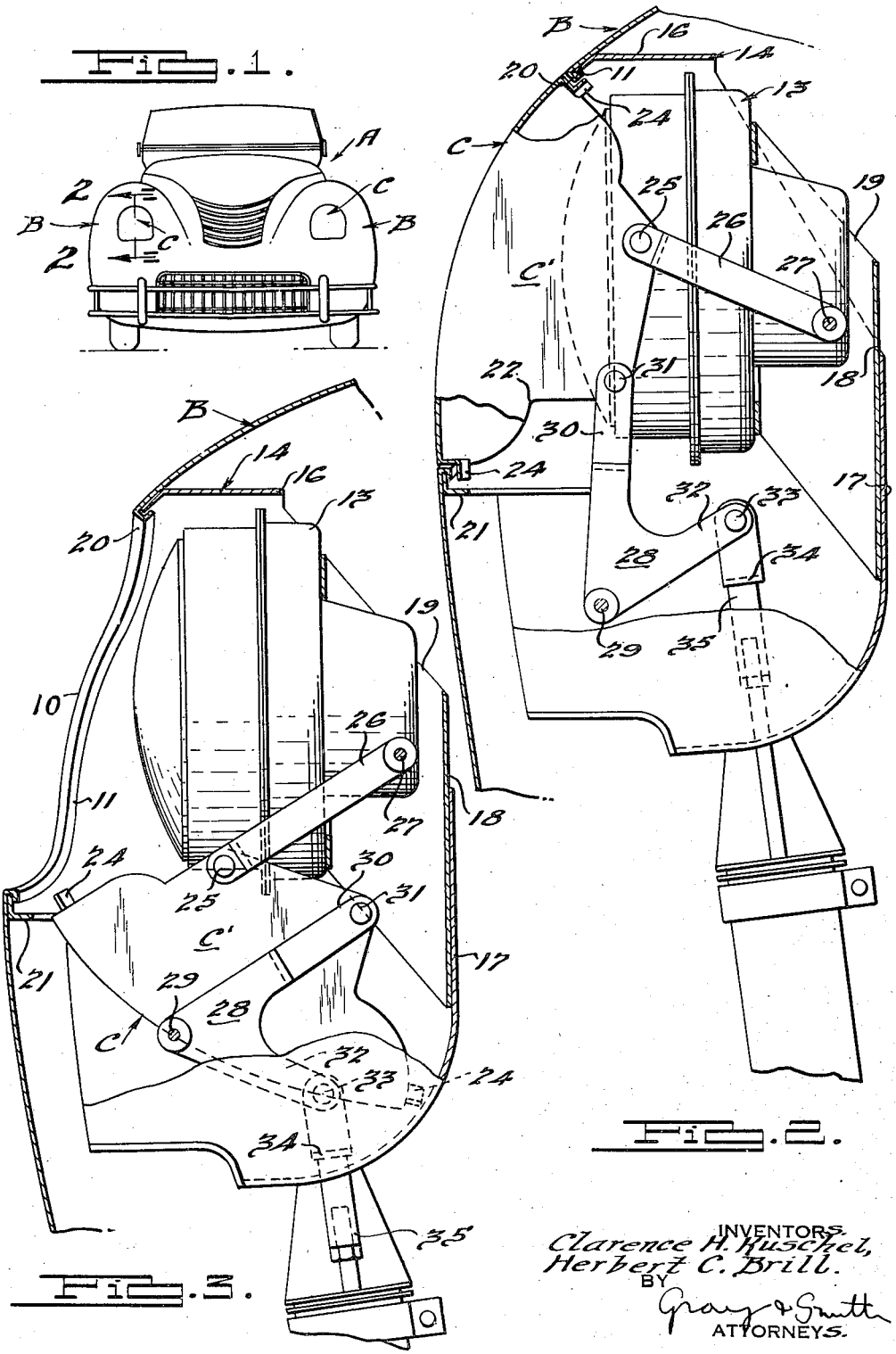

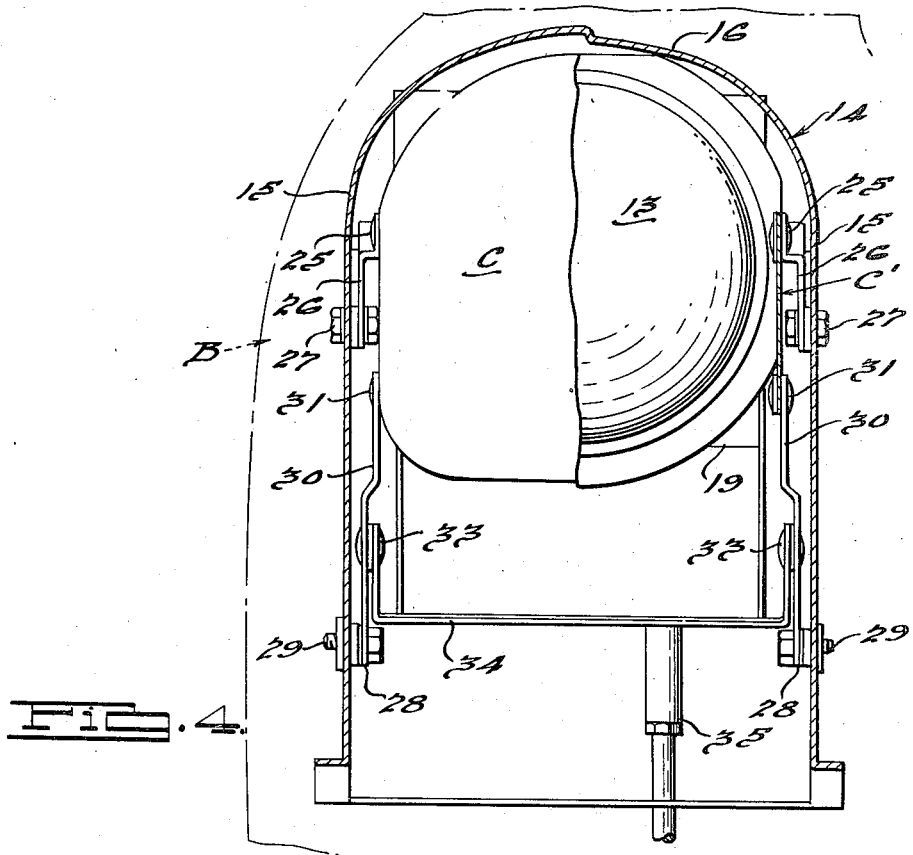
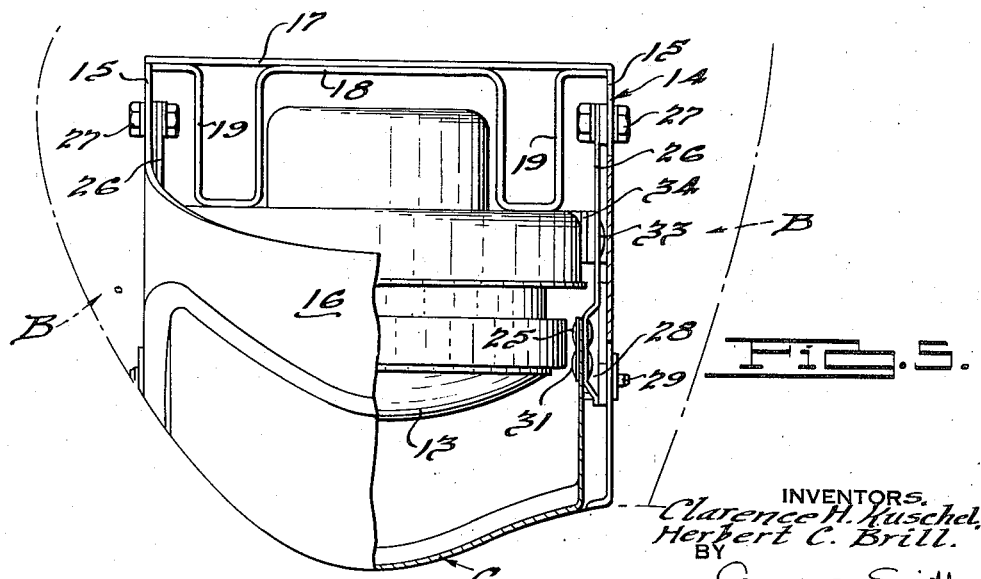

2,388,787

UNITED STATES PATENT OFFICE 2,388,787

HEAD-LAMP CLOSURE OR SHUTTER

Clarence H. Kuschel and Herbert C. Brill, Detroit, Mich., assignors to Briggs Manufacturing Comany, Detroit, Mich., a corporation of Michigan Application August 30, 1941, Serial No. 408,978

7 Claims. (Cl. 240—7.1)

This invention relates to motor vehicle bodies and more particularly to closure means or covers for the headlamps of such bodies for the purpose of concealing or masking the same from view at predetermined times.

One of the objects of the present invention is to provide a motor vehicle body in which the frontal surface is provided with an opening behind which is disposed a lamp, and closure or masking means for the opening under the control of the vehicle operator, which means is movable into and out of closed position beneath or behind a body frontal portion, such as a fender of the vehicle.

Another object of the present invention is to provide an improved device of the foregoing character adapted to close an opening formed in a frontal portion of the vehicle body, such as a front fender of said vehicle body, to preserve the streamlining or normal contour of said body.

A further object of the invention is to provide an improved headlamp cover, mask, or closure member and means for mounting the same which is of relatively simple and inexpensive construction.

Another object of the present invention is to provide an improved device of the foregoing character having improved supporting means for the mask or closure member for the opening in the frontal portion of the body in advance of the headlamp whereby to cause the closure member or mask to have an initial tilting or retracting movement in a transverse direction to release the edge of the mask prior to its shifting movement into open position.

The foregoing and other objects and advantages of the present invention will appear from the following description and appended claims when considered in connection with the accompanying drawings forming a part of this specification wherein like reference characters designate corresponding parts in the several views.

In said drawings:

Fig. 1 is a front elevational view of a motor vehicle embodying the present invention.

Fig. 2 is an enlarged vertical sectional view, partly in elevation and partly broken away, illustrating more particularly one of the lamps, taken substantially along the line 2—2 of Fig. 1 looking in the direction of the arrows, and showing the headlamp closure means, cover or mask in closed position.

Fig. 3 is a view similar to Fig. 2 but showing the closure means, cover or mask for the headlamp in open position.

Fig. 4 is a front elevational view, partly in section and partly broken away, showing the structure with the parts in their positions of Fig. 2; and Fig. 5 is a top plan view, partly in section and partly broken away, of the structure shown in Fig. 4.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The present invention contemplates an arrangement by which the closure is placed in an open position with respect to the opening when it is desired to light the headlamp and which is placed in closed position with respect to this opening when the headlamp is unlighted.

Referring now particularly to the drawings, the letter A designates a motor vehicle having spaced front fenders B each of which has an opening formed in the frontal surface thereof provided with a closure C for the opening, the closure having a surface contour which corresponds to and preserves the contour of the fender. The opening in the fender is designated by the reference character 10. This opening is reinforced by an internal surrounding flange 11, see particularly Fig. 3, forming a channeled edge 20. Located rearwardly of each of the openings and at the closure member C is an electric headlamp unit 13 of conventional construction which is adapted to cast light rays forwardly of the vehicle when the closure C is moved to an open position, such as that shown in Fig. 3. The closure C is adapted to be moved between the associated opening 10 and the lamp 13 to its open and closed positions and inasmuch as the mounting and movement of each of the lamp closures C is the same, a description of one will suffice for both.

Carried by the fender B is a support member or housing or casing which is generally indicated by the numeral 14. This support member or housing has spaced side forming walls 15 connected at their top by an arcuately shaped wall 16, and a back wall 17. The headlamp 13 is fixedly secured to the support 14 by an attaching member or bracket having a portion 18 which fronts and is secured to the wall 17 of the member 14 and which has laterally spaced forwardly extending arms 19 which, as shown, are substantially channel-shaped and secured to the casing of the headlamp 13, see particularly Fig. 5. The lateral extremities of the portion 18 and the outer wall of each of the channel-shaped arms 19 extend downwardly below the central portion of the attaching member, as shown in Fig. 2.

In attaching the member 14 to the fender B the edge of the portion 16 is deflected to extend into the channeled edge 20, which defines the opening 10 formed in the fender, and is secured thereto by welding. As seen in Figs. 2 and 3, a reinforcing angle member 21 extends between the side walls 15 of the member 14 and has side flanges secured to these walls, the frontal edge being deflected to extend into the channeled edge 20. The closure member or mask C is provided with a flange 24 which overlaps the flange 11 of the channeled edge 20.

The closure member or mask C is supported from the member 14 for movement between the headlamp 13 and the fender opening 10 so as to be selectively positioned as shown in Fig. 2 or as shown in Fig. 3. The closure C has laterally spaced rearwardly extending sides C' to the upper portion of each of which is pivotally attached at 25, one end of an arm or link 26, the other end of the latter being pivotally attached at 27 to the adjacent wall portion 15 of the member or housing 14. A bell crank 28, pivotally attached at 29 to each portion 15, has an arm 30 which is pivotally secured at 31 to the adjacent side C' of the closure or mask C, and a second arm 32 which is pivotally secured at 33 to a cross member or bar 34.

In the closed position of the mask or closure C, shown in Fig. 2, the center of the pivot 31 is disposed to the left of a dead center line through the pivot centers 25 and 29. The closure member C may be shifted from open to closed position and vice versa by means of a manually, or otherwise controlled operating rod 35 which is secured to the cross member or bar 34 and which is movable upwardly and downwardly for the purpose of oscillating the bell crank 28.

The operation of the foregoing device is substantially as follows: Downward movement of the rod 35 causes oscillation or rotation of the bell crank 28 in a clockwise direction, as viewed in Fig. 2 and the closure C and operating mechanism are moved to the respective positions shown in Fig. 3, the closure being oscillated or rotated in a counterclockwise direction. Initial movement of the bell crank 28 moves the lower part of the closure member C so as to give it an initial slight tilting or retracting movement transversely to a position which will clear it with respect to the adjacent edge 20 of the opening 10, the slight clearance between this edge and the closure permitting this initial retracting movement of the closure. This clearing of the closure with respect to the opening is the result of the rearward movement imparted to the closure during movement of the pivot 31 across a dead center line passing through the centers 25 and 29. This initial transverse tilting or retracting movement of at least a portion of the closure member or lid C is desirable in cases where the vehicle to which the device is applied is subjected to bad weather, such as sleet and ice storms. The initial movement will tend to break loose the joint and will permit the following movement or motion of the closure member without any great effort on the part of the operator.

It will be seen that the cover or closure C, when moved between the closed and open positions illustrated in Figs. 2 and 3, has three motions imparted to it. Starting from the closed position of Fig. 2, the cover is first moved rearwardly a small distance to clear the flanged edge of the opening 10. Thence, there is imparted to the cover a rotational motion around its pivot 25 with control link or arm 26, this being accomplished by the motion of bell crank 28, and at the same time the cover has a bodily downward motion due to the swinging of arm or link 26 about its pivot 27. The reverse of course takes place when the cover is shifted from open or lowered position, Fig. 3, to the closed position of Fig. 2.

We claim:

1. The combination with a motor vehicle frontal portion having an opening formed therein, of a headlamp disposed behind said opening, a closure member for said opening movable behind the frontal portion into and out of position in front of said headlamp and adapted in closed position to project into said opening, and means for shifting said closure member out of said opening and to one side of the headlamp and vice versa, said means including a swinging member pivoted to the closure member at a point and also pivoted to a fixed support, and a lever pivoted to a fixed support at a predetermined point and pivoted to the closure member at a point shiftable during operation past a dead center line passing through said first mentioned points.

2. The combination with a motor vehicle frontal portion having an opening formed therein, of a headlamp disposed behind said opening, a closure member for said opening movable behind the frontal portion into and out of position in front of said headlamp and adapted in closed position to project into said opening, and means for shifting said closure member out of said opening and to one side of the headlamp and vice versa, said means including a pair of swinging members pivoted to the closure member at spaced points and also pivoted to supporting means at spaced points, the pivotal point of connection of one member to the closure member adapted during operation to move across a dead center line passing through its pivotal point of support and the pivotal point of connection of the other member to the closure member.

3. The combination with a motor vehicle frontal portion having an opening formed therein, of a headlamp adapted to be disposed behind said opening, a closure for said opening movable behind the frontal portion into and out of position in front of said headlamp and adapted in closed position to project into said opening, a swinging member pivotally connected at one end to the closure, a swinging lever pivotally connected to the closure at a point spaced from the point of connection of said swinging member to the closure, and means for swinging said lever to impart both rotational and bodily shifting motion to the closure.

4. The combination with a motor vehicle frontal portion having an opening formed therein, of a headlamp adapted to be disposed behind said opening, a closure for said opening movable behind the frontal portion into and out of position in front of said headlamp and adapted in closed position to project into said opening, two swinging members pivotally connected to the closure for supporting the same, and means for operating one of the members to impart rotational motion to the closure about its pivotal connection with the other member.

5. The combination with a motor vehicle frontal portion having an opening formed therein, of a headlamp adapted to be disposed behind said opening, a closure for said opening movable behind the frontal portion into and out of position in front of said headlamp and adapted in closed position to project into said opening, two swinging members pivotally connected to the closure at spaced points, and means for swinging one member to partially rotate the closure about its pivotal connection with the other member and also to impart swinging motion to said other member.

6. The combination with a motor vehicle frontal portion having an opening formed therein, of a headlamp adapted to be disposed behind said opening, a closure for said opening movable behind the frontal portion into and out of position in front of said headlamp and adapted in closed position to project into said opening, two upper and lower swinging members pivotally connected at vertically spaced points to the closure, and means for swinging the lower member to impart rotational motion to the closure about its pivotal connection with the upper member and also to swing the upper member to shift the closure out of said opening to a position below the headlamp.

7. The combination with a motor vehicle frontal portion having an opening formed therein, of a headlamp adapted to be disposed behind said opening, a closure for said opening movable behind the frontal portion into and out of position in front of said headlamp and adapted in closed position to project into said opening, a pair of swinging members pivotally connected to the closure at spaced points for supporting the same, each member being also pivoted to supporting means, and means for shifting the closure into and out of the opening by swinging one of said members to move its point of connection with the closure across an imaginary line passing through its pivot on the supporting means and the point of pivotal connection of the other member with the closure.

CLARENCE H. KUSCHEL.
HERBERT C. BRILL.